(12) United States Patent
Gatland

(10) Patent No.: US 12,197,714 B2
(45) Date of Patent: Jan. 14, 2025

(54) DYNAMICALLY ZOOMED GAUGES SYSTEMS AND METHODS

(71) Applicant: FLIR Belgium BV, Meer (BE)

(72) Inventor: Christopher D. Gatland, Fareham (GB)

(73) Assignee: FLIR Belgium BV, Meer (BE)

( * ) Notice: Subject to any disclaimer, the term of this patent is extended or adjusted under 35 U.S.C. 154(b) by 0 days.

(21) Appl. No.: 17/979,655

(22) Filed: Nov. 2, 2022

(65) Prior Publication Data

US 2023/0141654 A1  May 11, 2023

Related U.S. Application Data

(60) Provisional application No. 63/278,450, filed on Nov. 11, 2021.

(51) Int. Cl.
*G06F 3/04847* (2022.01)

(52) U.S. Cl.
CPC .................. *G06F 3/04847* (2013.01)

(58) Field of Classification Search
CPC ............... G06F 3/04847; G06F 3/0487; G06F 2203/04806; G01D 7/00; G01D 7/04; G01C 23/00
See application file for complete search history.

(56) References Cited

U.S. PATENT DOCUMENTS

| | | | |
|---|---|---|---|
| 7,994,931 B2 | 8/2011 | Karstens et al. | |
| 8,600,663 B2 | 12/2013 | Kubota et al. | |
| 9,182,239 B2 | 11/2015 | Davis | |
| 10,518,851 B2 | 12/2019 | Cort et al. | |
| 2010/0026688 A1* | 2/2010 | Karstens | G01C 21/203 345/473 |
| 2010/0146436 A1* | 6/2010 | Jakobson | G09B 29/006 715/800 |
| 2014/0074325 A1 | 3/2014 | Nikolic et al. | |
| 2014/0164995 A1* | 6/2014 | Ghadge | G06F 11/324 715/810 |
| 2015/0348299 A1 | 12/2015 | Ott | |
| 2016/0364838 A1 | 12/2016 | Stillman | |

(Continued)

FOREIGN PATENT DOCUMENTS

| | | |
|---|---|---|
| EP | 3339809 | 6/2018 |
| GB | 2471785 A | 12/2011 |
| JP | 2010266288 | 11/2010 |

*Primary Examiner* — Kc Chen
(74) *Attorney, Agent, or Firm* — Haynes and Boone, LLP

(57) ABSTRACT

Techniques are disclosed for systems and methods to provide dynamically adjusted instrumentation for improved user convenience. In one example, the dynamically adjusted instrumentation provides a virtual gauge comprising a plurality of segments, wherein each segment is associated with a corresponding range of values for a monitored condition; receives a first value within a first one of the range of values; renders on a user display the first value with a first one of the segments associated the first range while excluding from the user display at least a portion of a second one of the segments associated with a second one of the range of values; receives a second value associated with the second range of values; and renders on the user display the second value with the second segment while excluding from the user display at least a portion of the first segment.

20 Claims, 11 Drawing Sheets

(56) References Cited

U.S. PATENT DOCUMENTS

2018/0086477 A1    3/2018  He et al.
2019/0263487 A1    8/2019  Corl et al.
2019/0310643 A1*  10/2019  Yokoi ................... B63B 32/60
2022/0287779 A1*  9/2022  Poland ................... A61B 8/463

* cited by examiner

DYNAMICALLY ZOOMED GAUGES SYSTEMS AND METHODS

CROSS REFERENCE TO RELATED APPLICATIONS

This application claims priority to and the benefit of U.S. Provisional Patent Application No. 63/278,450 filed Nov. 11, 2021 and entitled "DYNAMICALLY ZOOMED GAUGES SYSTEMS AND METHODS," which is herein incorporated by reference in its entirety.

TECHNICAL FIELD

One or more embodiments of the invention relate generally to instrumentation and more particularly, for example, to systems and methods for dynamically adjusted instrumentation for improved user convenience.

BACKGROUND

Marine navigation is the use of navigation techniques to guide a vessel from one point to the next. Marine navigation is utilized to locate a current position, determine a course, and monitor the course. There are many different marine navigation methods, instruments, and systems utilized to navigate waterways. Current marine navigation methods include celestial navigation, dead reckoning, inertial navigation, and electronic navigation. Locations may be determined based on a previous location (dead reckoning), or based on some sort of object (star, landmark, or buoy). Some commonly used tools include compass, Global Positioning Systems (GPS), radar, and sextant. However, traditional dial navigation systems fail to provide adequate readability when located at a distance from a viewing position of a user of the vessel. At any moment, the user may be interested in small fluctuations of wind angle, boat heading, etc. Traditional dial navigation systems waste a lot of the display area, for example, a crucial area of importance to the user on a static dial may be much smaller than necessary when rendered on a display.

SUMMARY

Techniques are disclosed for systems and methods for providing dynamically adjusted instrumentation for improved user convenience. In accordance with one or more embodiments, a method for dynamically adjusted instrumentation includes providing a virtual gauge comprising a plurality of segments, wherein each segment is associated with a corresponding range of values for a monitored condition; receiving a first value within a first one of the range of values; rendering on a user display the first value with a first one of the segments associated the first range while excluding from the user display at least a portion of a second one of the segments associated with a second one of the range of values; receiving a second value associated with the second range of values; and rendering on the user display the second value with the second segment while excluding from the user display at least a portion of the first segment.

In various embodiments, a dynamically zoomed gauge system may include a logic device configured to communicate with a user display and at least one operational state sensor, wherein the logic device is configured to: provide a virtual gauge comprising a plurality of segments, wherein each segment is associated with a corresponding range of values for a monitored condition associated with the at least one operational state sensor; receive a first value within a first one of the range of values; render on a user display the first value with a first one of the segments associated the first range while excluding from the user display at least a portion of a second one of the segments associated with a second one of the range of values; receive a second value associated with the second range of values; and render on the user display the second value with the second segment while excluding from the user display at least a portion of the first segment.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, systems and methods are provided for dynamically zoomed gauges for enhanced accuracy. As stated previously, traditional dial navigation systems fail to provide adequate readability when located at a distance from a viewing position of a user (e.g., a user) of the vessel. Thus, embodiments of the present disclosure improve over traditional dial navigation system by providing a digital virtual gauge, such as a 360° gauge, an arc gauge (i.e. not completely 360°), semicircular gauge, etc., which automatically zooms and/or pans to keep a most relevant portion of the gauge within the confines of the display, thereby maximizing visibility to the user of the vessel, hereinafter referred to as a mobile structure, by enlarging an area of interest most prevalent to the user. The dynamically zoomed gauge system may utilize one or more sensors such as, for example, a Marine chart, a global positioning system (GPS), an automatic identification system (AIS), a radar, cameras, etc. One or more of the sensors may require a convolutional neural network (CNN), since non-water objects must be detected and classified, and a dedicated graphics processing unit (GPU).

Figure 1A:
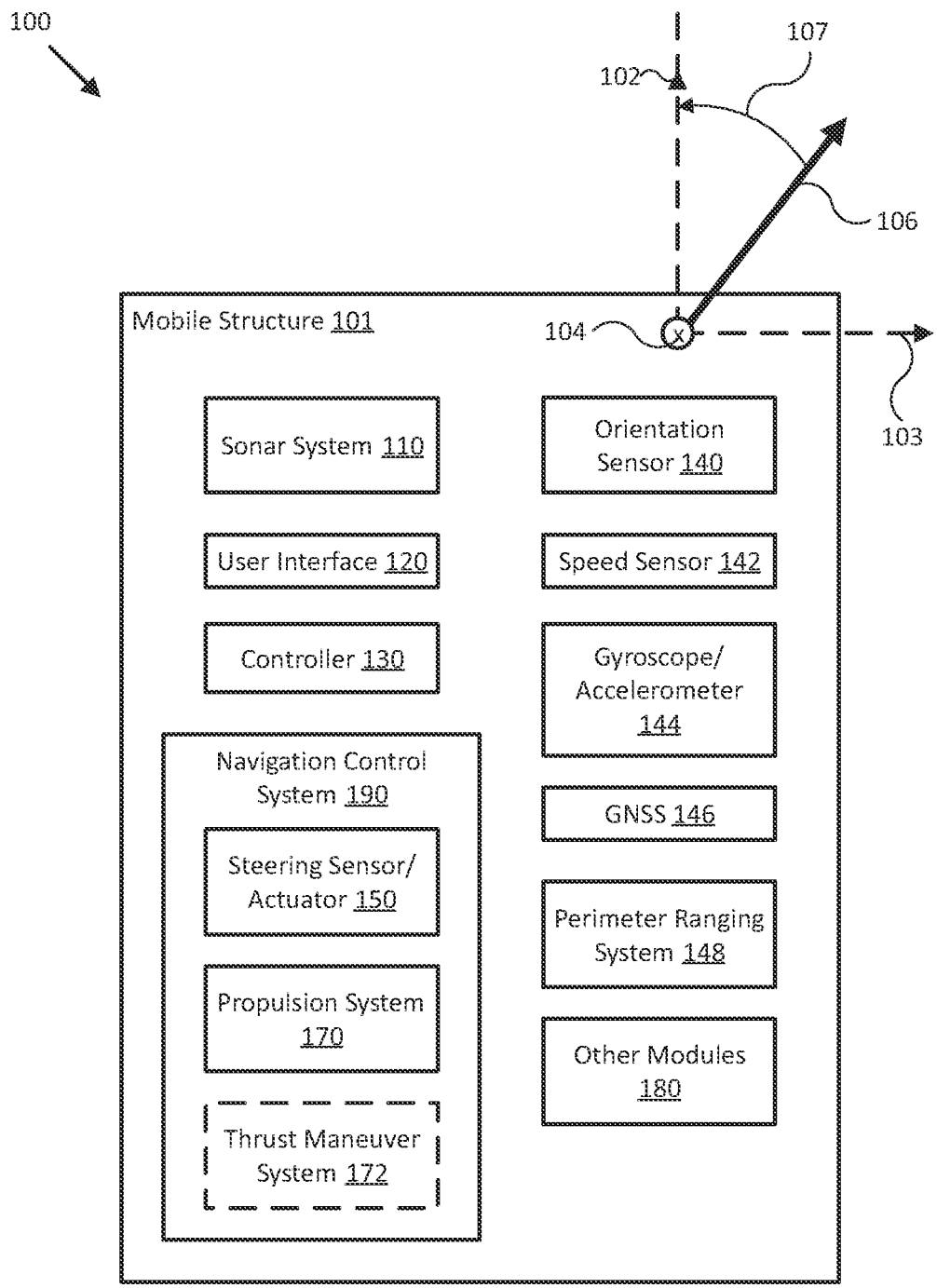
FIG. 1A illustrates a block diagram of a dynamically zoomed gauge system in accordance with an embodiment of the disclosure.

FIG. 1A illustrates a block diagram of a dynamically zoomed gauge system 100 in accordance with an embodiment of the disclosure. In various embodiments, system 100 may be adapted to provide sea traffic management (STM) sensor calibration for a particular mobile structure 101. In some embodiments, system 100 may be adapted to measure an orientation, a position, and/or a velocity of mobile structure 101. System 100 may then use these measurements to provide STM sensor calibration, which may then be used to control operation of mobile structure 101, such as controlling elements of navigation control system 190 (e.g., steering actuator 150, propulsion system 170, and/or optional thrust maneuver system 172) to steer or orient mobile structure 101 according to a desired heading or orientation, such as heading angle 107, for example.

In the embodiment shown in FIG. 1A, system 100 may be implemented to provide STM sensor calibration for a particular type of mobile structure 101, such as a drone, a watercraft, an aircraft, a robot, a vehicle, and/or other types of mobile structures. Although the principles of the present disclosure will be primarily discussed in relation to vessels and watercraft, they may be applied to any type of vehicle or system where dynamically zoomed gauges are useful.

In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a perimeter ranging system 148, a steering sensor/actuator 150, a propulsion system 170, a thrust maneuver system 172, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 (e.g., target heading) onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

User interface 120 (e.g., a user display) may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a media access control (MAC) address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for navigation control system 190 to cause mobile structure 101 to move according to the target heading, waypoint, route, track, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), and Docking responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of navigation control system 190, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine-readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops to model or provide device control, steering control (e.g., using navigation control system 190) and/or performing other various operations of mobile structure 101 and/or system 100. In some embodiments, a control loop may include processing sensor signals and/or sensor information to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GNSS 146, a measured steering angle from steering sensor/actuator 150, perimeter sensor data from perimeter ranging system 148, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand or other control signal for navigation control system 190 based on one or more of the received sensor signals, including the user input, and provide the steering demand/control signal to steering sensor/actuator 150 and/or navigation control system 190.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101. For example, speed sensor 142 may be configured to provide an absolute or relative wind velocity or water velocity impacting mobile structure 101. In various embodiments, system 100 may include multiple embodiments of speed sensor 142, such as one wind velocity sensor and one water velocity sensor. In various embodiments, speed sensor 142 may be referred to as an STM sensor.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. GNSS 146 may also be used to estimate a relative wind velocity or a water current velocity, for example, using a time series of position measurements while mobile structure is otherwise lacking powered navigation control.

Perimeter ranging system 148 may be adapted to detect navigation hazards within a monitoring perimeter of mobile structure 101 (e.g., within a preselected or predetermined range of a perimeter of mobile structure 101) and measure ranges to the detected navigation hazards (e.g., the closest approach distance between a perimeter of mobile structure 101 and a detected navigation hazard) and/or relative velocities of the detected navigation hazards. In some embodiments, perimeter ranging system 148 may be implemented by one or more ultrasonic sensor arrays distributed along the perimeter of mobile structure 101, radar systems, short range radar systems (e.g., including radar arrays configured to detect and/or range objects between a few centimeters and 10s of meters from a perimeter of mobile structure 101), visible spectrum and/or infrared/thermal imaging modules or cameras, stereo cameras, light detection and ranging (LIDAR) systems, combinations of these, and/or other perimeter ranging systems configured to provide relatively fast and accurate perimeter sensor data (e.g., so as to accommodate suddenly changing navigation conditions due to external disturbances such as tide and wind loadings on mobile structure 101).

Navigation hazards, as used herein, may include an approaching dock or tie down post, other vehicles, floating debris, mooring lines, swimmers or water life, and/or other navigation hazards large and/or solid enough to damage mobile structure 101, for example, or that require their own safety perimeter due to regulation, safety, or other concerns. As such, in some embodiments, perimeter ranging system 148 and/or controller 130 may be configured to differentiate types of navigation hazards and/or objects or conditions that do not present a navigation hazard, such as seaweed, pollution slicks, relatively small floating debris (e.g., depending on a relative speed of the floating debris), and/or other non-hazardous but detectable objects.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101 and may be adapted to sense and/or physically adjust the control surfaces to a variety of positive and/or negative steering angles/positions.

Figure 1B:
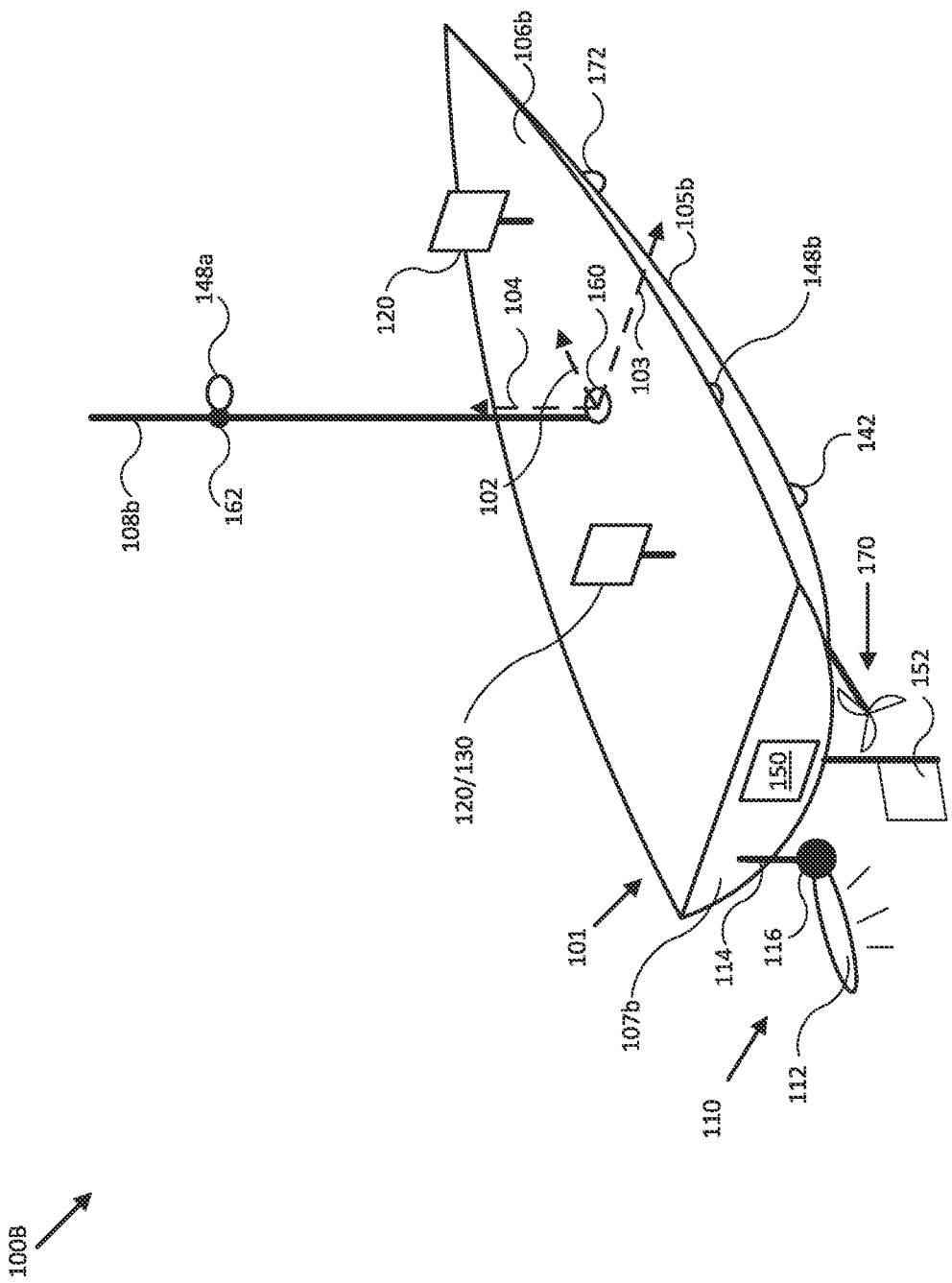
FIG. 1B illustrates a diagram of a watercraft including a dynamically zoomed gauge system in accordance with an embodiment of the disclosure.
Figure 1C:
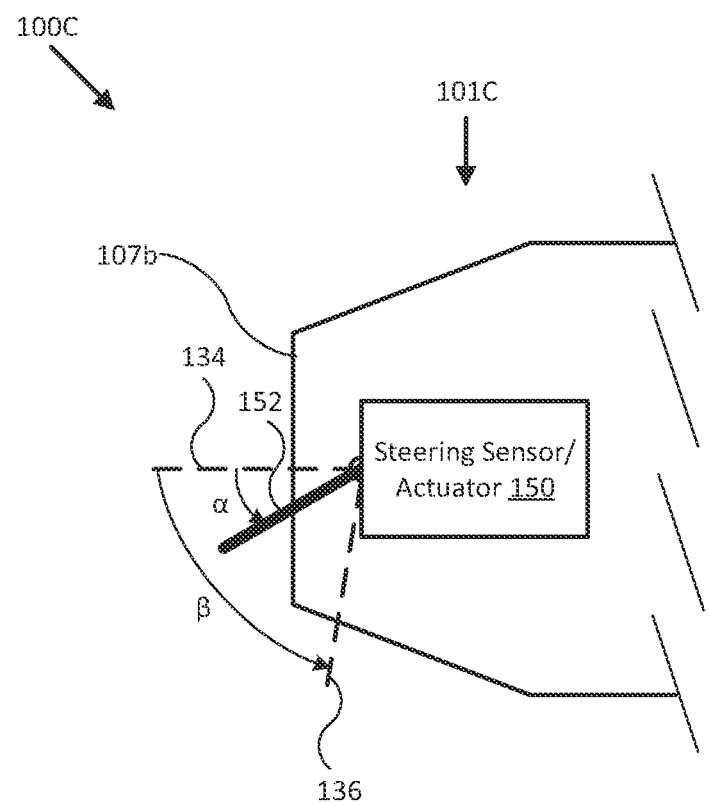
FIG. 1C illustrates a diagram of a steering sensor/actuator for a dynamically zoomed gauge system in accordance with an embodiment of the disclosure.

For example, FIG. 1C illustrates a diagram of a steering sensor/actuator for a dynamically zoomed gauge system in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle $\alpha$ measured relative to a zero steering angle direction (e.g., designated by a dashed line 134). In various embodiments, steering sensor/actuator 150 may be implemented with a steering actuator angle limit (e.g., the positive limit is designated by an angle $\beta$ and a dashed line 136 in FIG. 1C), and/or a steering actuator rate limit "R".

As described herein, a steering actuator rate limit may be a limit of how quickly steering sensor/actuator 150 can change a steering angle of a steering mechanism (e.g., rudder 132), and, in some embodiments, such steering actuator rate limit may vary depending on a speed of mobile structure 101 along heading 107 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 142, speed sensor 144, and/or GNSS 146, for example.

In various embodiments, steering sensor/actuator 150 may be implemented as several separate sensors and/or actuators, for example, to sense and/or control one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to affect a particular navigation maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to affect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle $\alpha$ may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle $\alpha$ may be determined by controller 130 according to a pre-determined algorithm, for example, or through use of an adaptive algorithm for training various control loop parameters characterizing the relationship of steering angle $\alpha$ to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Optional thrust maneuver system 172 may be adapted to physically adjust a position, orientation, and/or linear and/or angular velocity of mobile structure 101 according to one or more control signals and/or user inputs provided by a logic device of system 100, such as controller 130. Thrust maneuver system 172 may be implemented as one or more directional propellers and/or vector thrusters (e.g., directional water jets), and/or a system of fixed propellers and/or thrusters coupled to mobile structure 101 that can be powered at different levels and/or reversed to maneuver mobile structure 101 according to a desired linear and/or angular velocity.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein, for example, including for transmitting and/or receiving communications, such as sensor signals, sensor information, and/or control signals, between one or more devices of system 100. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), controller area network (CAN) bus interfaces, and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, Wi-Fi, Bluetooth, Zigbee, Xbee, Micronet, CAN bus, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of a watercraft including a dynamically zoomed gauge system in accordance with an embodiment of the disclosure. In the embodiment shown in FIG. 1B, system 100B may be implemented to provide STM sensor calibration and/or additional operational control of mobile structure 101, similar to system 100 of FIG. 1B. For example, system 100B may include integrated user interface/controller 120/130, secondary user interface 120, perimeter ranging system 148a and 148b, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, articulated thrust maneuver jet 172, an actuated sonar system 110 coupled to transom 107b, perimeter ranging system 148a (e.g., a camera system, radar system, and/or LIDAR system) coupled to mast/sensor mount 108b, optionally through roll, pitch, and/or yaw actuator 162, and perimeter ranging system 148b (e.g., an ultrasonic sensor array and/or short range radar system)) coupled to hull 105b or deck 106b substantially above a water line of mobile structure 101. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of perimeter ranging system 148 according to control signals and/or an orientation or position of mobile structure 101 provided by user interface/controller 120/130. For example, user interface/controller 120/130 may be adapted to receive an orientation of transducer assembly 112 and/or perimeter ranging system 148 (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed, such as a STM or speed through water (STW) sensor configured to measure the relative speed of mobile structure 101 through a surrounding water medium, substantially along direction/longitudinal axis 102. In some embodiments, speed sensor 142 may be adapted to provide a relatively thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

As discussed previously, controller 130 may be adapted to detect navigation hazards within a monitoring perimeter of mobile structure 101. A safe depth depends on tide height, keel depth, wave height, and a safety margin. Controller 130 may interpolate tide height from a set of nearby tide stations with triangulation (weighted mean between a nearest number (e.g., three) tide stations based on position). In most regions, changes in tide height between tide stations is minimal, so interpolation will be accurate. In some regions, there are substantial changes over small distances, but this is signaled by fast flow (races). Therefore, controller 130 weights the tide height interpolation according to current (speed). Controller 130 find and validates difficult regions by inspecting world maps for fast flowing current and focuses validation on these areas. The principle is that fast flow indicates rapid change of tide height, so interpolation between tide stations may be nonlinear with the nonlinearity driven by the current data. Furthermore, interpolation may not happen across tide stations separated by land. Additionally, controller 130 may factor in atmospheric pressure plus a safety margin for local wind effects.

Again, to provide a dynamically zoomed gauge system that improves on traditional dial navigation systems, the dynamically zoomed gauge system of the illustrative embodiment utilizes a digital virtual gauge, such as a 360° gauge, an arc gauge (i.e. not completely 360°), semicircular gauge, etc., which automatically zooms and pans to keep a most relevant portion of the dial in view. Dial gauges, i.e. circular gauges, are particularly suitable for being dynamically zoomed in that, by seeing a rendered segment on the user interface 120, the user instinctively knows how the rendered segment relates to the entire dial gauge and hence, the current indication associated with the rendered segment is clear. For example, in some embodiments, the digital virtual gauge may be a digital representation of an analog instrument.

The dynamically zoomed gauge system automatically animates the digital gauge based on a current heading, wind speed, angle, etc., panning around the zoomed gauge to offer a close-up view on the user interface 120 of an area where a direction needle is pointing. The dynamically zoomed gauge system also rearranges other screen elements, i.e. Apparent Wind Angle (AWA) (relative to the bow, 0 to 180, starboard plus, port minus), Apparent Wind Direction (AWD) (relative to true north), True Wind Direction (TWD) (relative to true north), True Wind Speed (TW S) (relative to the fixed earth), temperature, speed, pressure, location, fuel level, and/or any other parameter associated with the mobile structure 101, to maintain the impression that the gauge is located in the center of the user interface 120.

The processes illustrated in the following flow diagrams and related Figures may be used to provide general navigational control for mobile structure 101. It should be appreciated that any step, sub-step, sub-process, or block of the processes may be performed in an order or arrangement different from the embodiments illustrated by the Figures. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although the processes are described with reference to systems, processes, control loops, and images described about FIGS. 1A-1C, the processes may be performed by other systems different from those systems, processes, control loops, and images and including a different selection of electronic devices, sensors, assemblies, mobile structures, and/or mobile structure attributes, for example.

Figure 2:
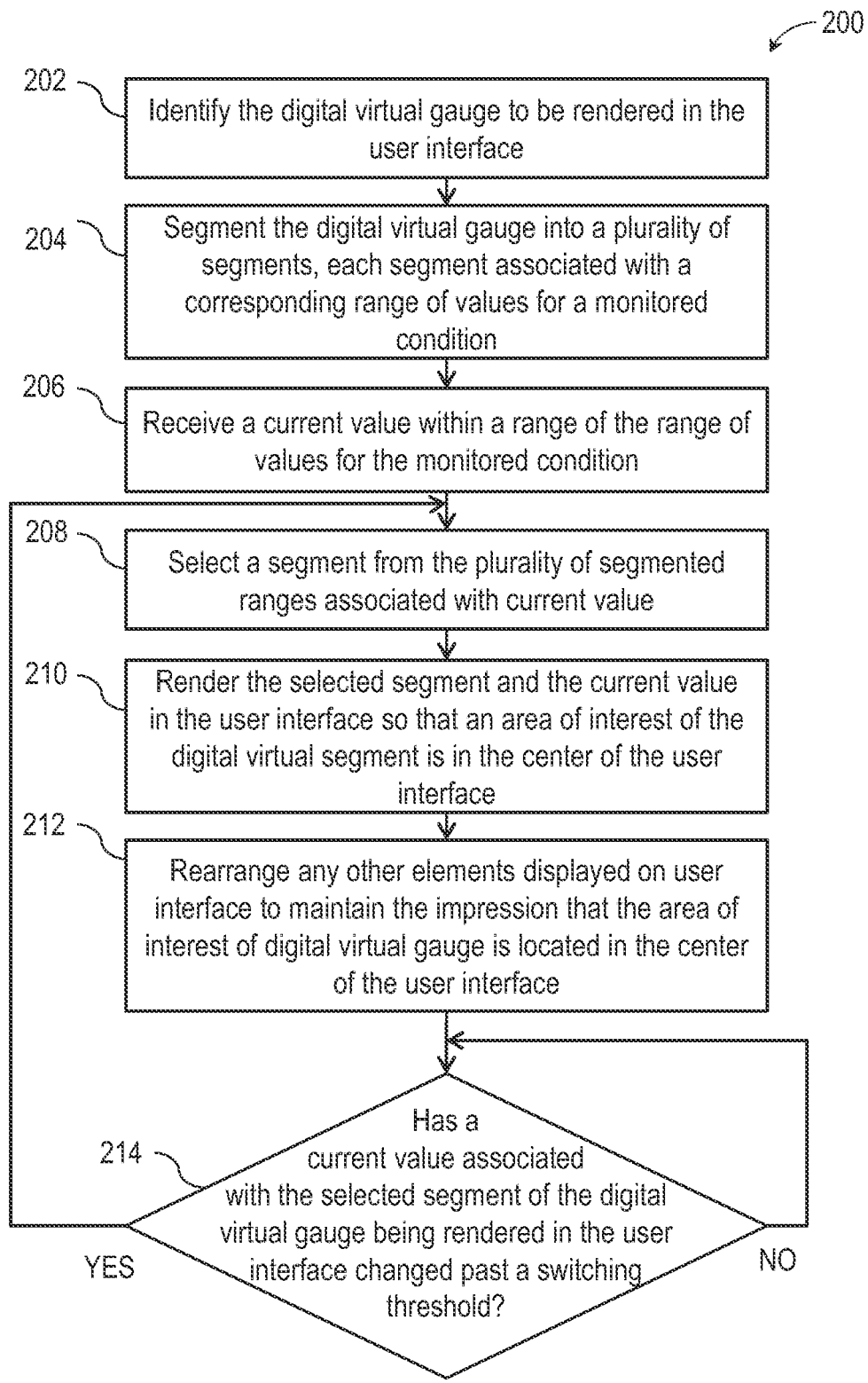
FIG. 2 illustrates a flow diagram of a process to dynamically adjust a rendered digital virtual gauge to automatically zoom and/or pan to keep a relevant portion of the gauge within the confines of the user interface, thereby maximizing the relevant portion visible to the user of the mobile structure in accordance with an embodiment of the disclosure.

FIG. 2 illustrates a flow diagram of a process 200 to dynamically adjust a rendered digital virtual gauge to automatically zoom and/or pan to keep a relevant portion of the gauge within the confines of the user interface 120, thereby maximizing the relevant portion visible to the user of the mobile structure 101 in accordance with an embodiment of the disclosure. The dynamically zoomed gauge system that performs process 200 utilizes a plurality of segmented ranges to switch between zoomed portions of the digital virtual gauge. In the various embodiments, there may be any desired number of segments of any desired size and exhibiting any desired amount of overlap therebetween. As a result, the transition between a first segment and a second segment may be rendered to provide an effectively continuous moving gauge such that the transition between any two segments is a visually smooth transition to the user. Thus, in block 202, controller 130 identifies the digital virtual gauge to be rendered in the user interface 120. In block 204, the controller 130 segments the digital virtual gauge into a plurality of segments based on predefined setting, a set of user preferences, etc. Each segment in the plurality of segments associated with a corresponding range of values for a monitored condition.

For example, if the digital virtual gauge to be rendered is a virtual 360° gauge that identifies true wind angle (TWA) for the mobile structure 101, the controller 130 may utilize an associated plurality of segmented ranges, e.g., a first segment from greater than or equal to 0° to less than 68.75° starboard, a second segment from greater than or equal to 68.75° starboard to less than 116.25° starboard, a third segment from greater than or equal to 116.25° starboard to less than 116.25° port, a fourth segment from greater than or equal to 116.25° port to less than 68.75° port, and a fifth segment from greater than or equal to 68.75° port to less than 360°/0°. It is noted that the illustrative embodiments are not limited to only this type of virtual gauge as well as not being limited to five segments. That is, the illustrative embodiment may be applied to any type of digital virtual gauge, such as a 360° gauge, an arc gauge (i.e. not completely 360°), semicircular gauge, etc., for applications such as heading, compass, speedometer, temperature, pressure, etc., where a large proportion of the viewable gauge area is essentially wasted space without departing from the spirit of the present disclosure. Further, any number of segments may be utilized by controller 130 in order for the controller 130 to maximizing the relevant portion visible to the user of the mobile structure 101 and keep a relevant portion of the gauge within the confines of the user interface 120.

In block 206, the controller 130 receives a current value within a range of values for the monitored condition associated with the digital virtual gauge to be rendered. For example, the controller 130 determines the TWA from the bow of the mobile structure 101 based on information detected by one or more of the sensors and/or the modules described in FIGS. 1A-1C. Thus, the controller 130 determines the TWA based on the Apparent Wind Angle (AWA) (relative to the bow, 0 to 180, starboard plus, port minus), the Apparent Wind Direction (AWD) (relative to true north), and the knotmeter speed (S) (relative to the water) of mobile structure 101.

Based on the current value, in block 208, the controller 130 selects a segment from the plurality of segmented ranges associated with current value. For example, if the TWA is determined to be 115° starboard, the controller 130 selects the second segment that is greater than or equal to 68.75° starboard to less than 116.25° starboard. In block 210, the controller renders the selected segment in the user interface 120 so that an area of interest of the digital virtual segment is in the center of the user interface 120. For example, the controller 130 pans the displayed digital virtual segment so that a center of the digital virtual gauge is to the left of the user interface 120 and the range of displayed arc of the digital virtual gauge from 68.75° to 116.25° starboard is displayed in the center of the user interface 120 with the determined TWA illustrated as a direction needle pointing to 115°.

In block 212, the controller 130 rearranges any other elements associated with other monitored conditions displayed on user interface 120 to maintain the impression that the area of interest of digital virtual gauge is located in the center of the user interface 120. For example, the controller 130 may display other monitored conditions such as, the AWA, the AWD, as well as a true wind direction (TWD) (relative to true north). In keeping with the previous example, since the center of the digital virtual segment is on the left of the user interface 120 and the range of displayed arc of the digital virtual segment from 68.75° to 116.25° starboard is displayed in the center of the user interface 120, the other elements associated with the other monitored conditions would be displayed on the right side of the user interface 120.

The controller 130 may utilize hysteresis to ensure that the digital virtual segment, other elements, etc., displayed on the user interface 120 do not rapidly change when the current value is close to a switching threshold condition. This may be further improved by using calculations to assess one or more of heading, current wind direction, sail configuration, measured forces in the rigging, boat structure, etc., and comparing these calculations with the mobile structure's 101 performance characteristics (i.e., polars, wind changes, etc.) to determine the mobile structure's 101 current point of sail (upwind, downwind, reaching, broadreach, etc.), heading, etc. That is, the controller 130 may, prior to switching to a rendering of another segment, determine whether the other segment should be rendered immediately or delayed for a predetermined amount of time utilizing a hysteresis that identifies one or more of a plurality of attributes associated with the mobile structure 101. This determination may be utilized to maintain the stability of the current digital virtual segment in the user interface 120 when approaching a switching threshold condition.

In block 214, the controller 130 determines whether a current value associated with the selected segment of the digital virtual gauge being rendered in the user interface 120 has changed past a switching threshold (e.g., a threshold condition). If in block 214, the controller 130 determines that current value associated with the selected segment of the digital virtual gauge being rendered in the user interface 120 fails to have changed past the switching threshold condition, then the process returns to block 214 to continue monitoring the current value. For example, if the TWA is determined to currently be 90° starboard, the controller 130 maintains displaying the second segment in the user interface because the TWA of 90° is in the range of greater than or equal to 68.75° starboard to less than 116.25° starboard. However, if in block 214, the controller 130 determines that the current value associated with the selected segment of the digital virtual gauge being rendered in the user interface 120 has changed past a switching threshold condition, the process would return to block 208. For example, if the TWA is determined to currently be 52° starboard, then the controller 130 select the first segment from greater than or equal to 0° to less than 68.75° starboard, with the process continuing as described previously.

Figure 3A:
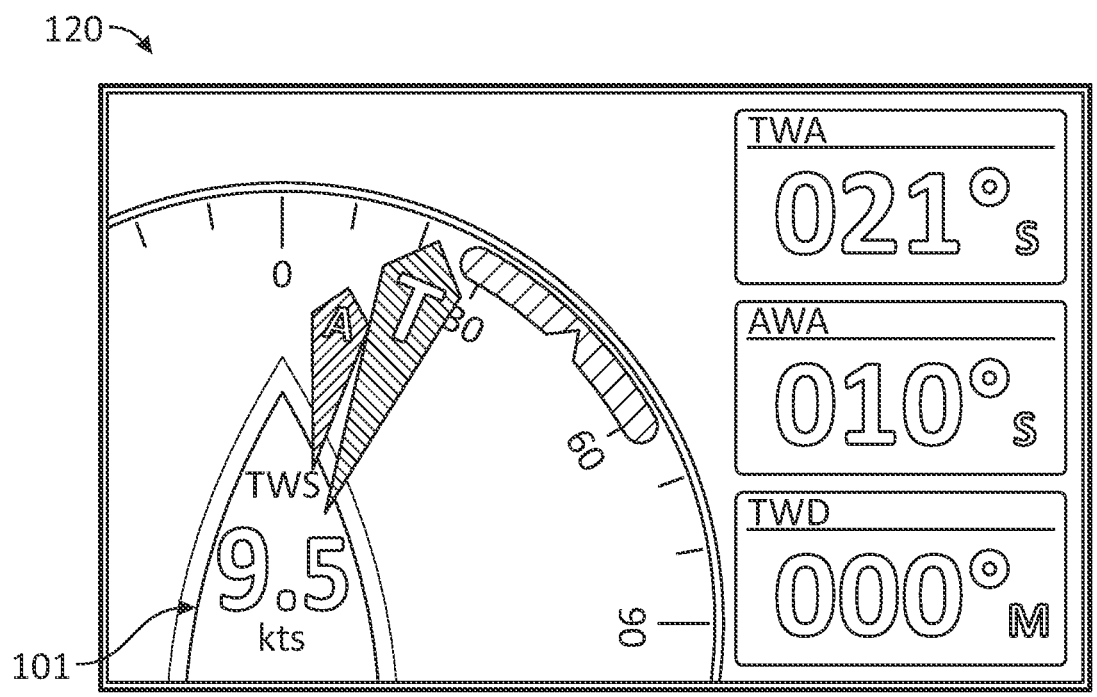
FIGS. 3A-3E illustrate the dynamic adjustment of a rendered true wind angle (TWA) digital virtual gauge to keep a relevant portion of the gauge within the confines of the user interface 120, thereby maximizing the relevant portion visible to the user of the mobile structure 101 in accordance with an embodiment of the disclosure.

FIGS. 3A-3E and FIGS. 4A-4I illustrate various example renderings of digital virtual gauges provided by block 210 during repeated iterations of blocks 208 through 214 of process 200 of FIG. 2. For example, FIGS. 3A-3E illustrate the dynamic adjustment of a rendered true wind angle (TWA) digital virtual gauge to keep a relevant portion of the gauge within the confines of the user interface 120, thereby maximizing the relevant portion visible to the user of the mobile structure 101 in accordance with embodiments of the disclosure. FIG. 3A illustrates the controller 130 rendering a first segment of the plurality of segments of a TWA digital virtual gauge when the TWA is greater than or equal to 0° to less than 68.75° starboard based on a current heading of mobile structure 101. Again, the controller 130 determines the TWA based on the Apparent Wind Angle (AWA) (relative to the bow, 0 to 180, starboard plus, port minus), the Apparent Wind Direction (AWD) (relative to true north), and the knotmeter speed (S) (relative to the water) of mobile structure 101. In the rendering in user interface 120, the TWA is indicated by the "T" needle and the "A" needle indicates the Apparent Wind Angle (AWA). Thus, it will be appreciated that the digital virtual gauge of FIG. 3A (and also FIGS. 3B-3E further discussed herein) may display values associated with two different monitored conditions (e.g., TWA and AWA) with the same segment of the digital virtual gauge.

In the rendering of FIG. 3A, the controller 130 pans the displayed digital virtual segment so that a center of the digital virtual gauge is to the bottom left of the user interface 120 and the range of displayed arc of the digital virtual gauge is displayed in the center of the user interface 120. Additionally, in the rendering, the controller arranges the other elements of the AWA, the Apparent Wind Direction (AWD), and the true wind direction (TWD) so that these elements are to the right of the user interface 120 to maintain the impression that the area of interest of digital virtual gauge is located in the center of the user interface 120.

Figure 3B:
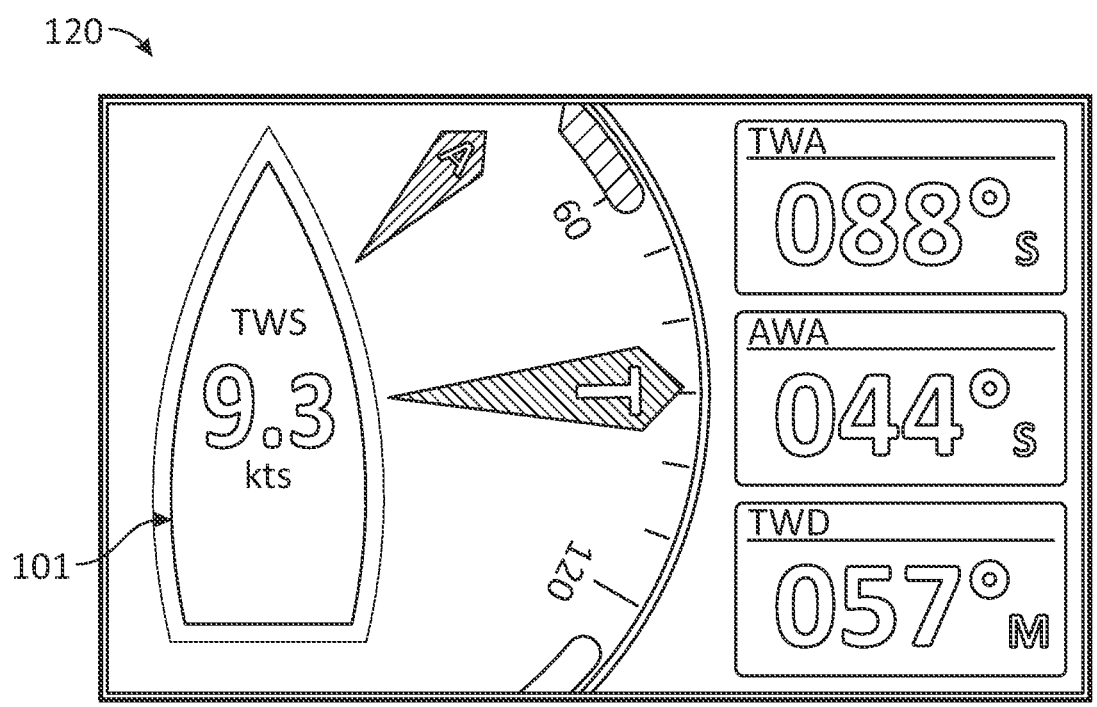

FIG. 3B illustrates the controller 130 rendering a second segment of the plurality of segments of the TWA digital virtual gauge due to the heading of the mobile structure changing when the TWA is greater than or equal to 68.75° starboard to less than 116.25° starboard based on a current heading of mobile structure 101. In the depicted rendering, the controller 130 pans the displayed digital virtual segment so that a center of the digital virtual gauge is to the left of the user interface 120 and the range of displayed arc of the digital virtual gauge is displayed in the center of the user interface 120. Additionally, in the rendering, the controller arranges the other elements of the AWA, the AWD, and TWD so that these elements are to the right of the user interface 120 to maintain the impression that the area of interest of digital virtual gauge is located in the center of the user interface 120.

Figure 3C:
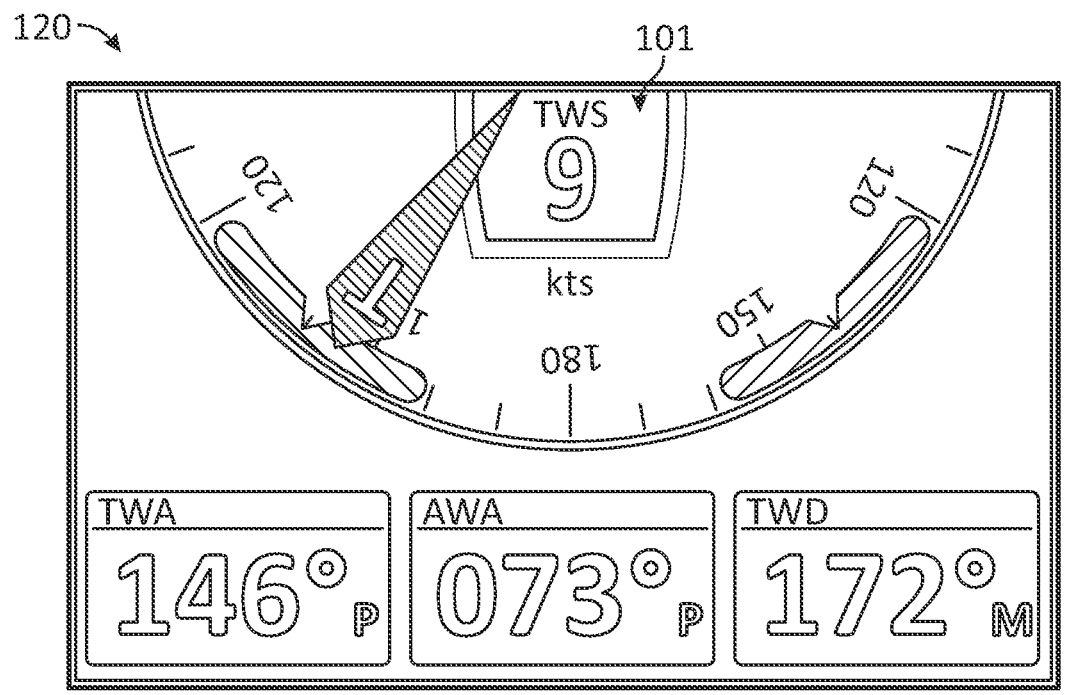

FIG. 3C illustrates the controller 130 rendering a third segment of the plurality of segments of the TWA digital virtual gauge due to the heading of the mobile structure changing when the TWA is greater than or equal to 116.25° starboard to less than 116.25° port based on a current heading of mobile structure 101. In the depicted rendering, the controller 130 pans the displayed digital virtual segment so that a center of the digital virtual gauge is to the top center of the user interface 120 and the range of displayed arc of the digital virtual gauge is displayed in the center of the user interface 120. Additionally, in the rendering, the controller arranges the other elements of the AWA, the AWD, and the TWD so that these elements are to the bottom of the user interface 120 to maintain the impression that the area of interest of digital virtual gauge is located in the center of the user interface 120.

Figure 3D:
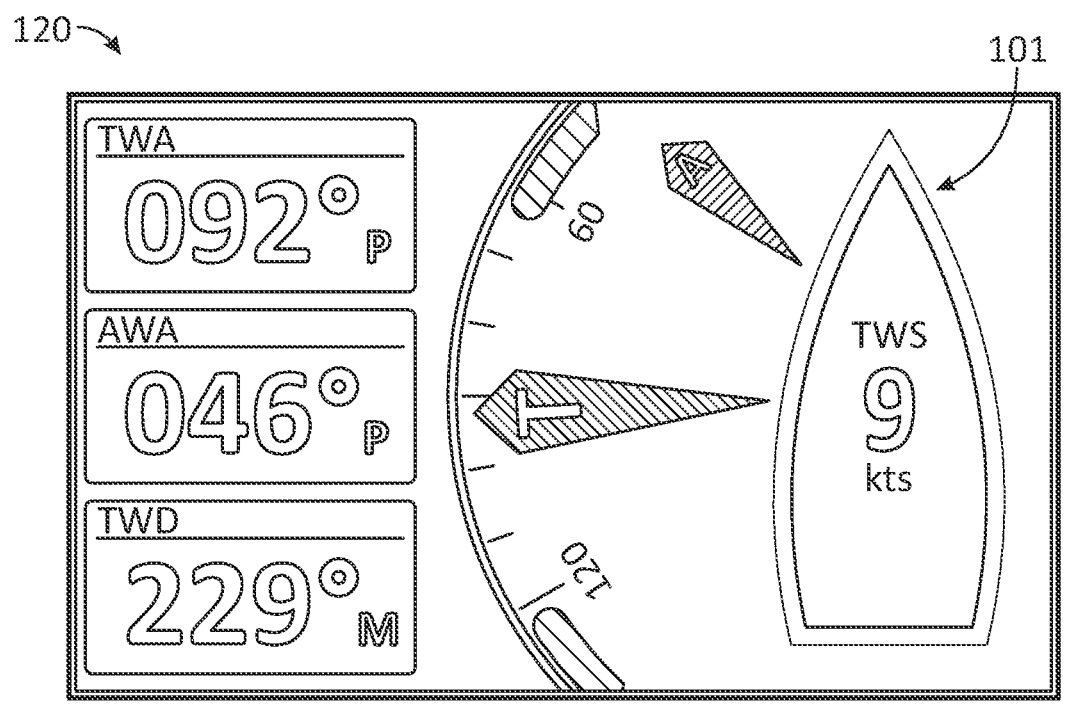

FIG. 3D illustrates the controller 130 rendering a fourth segment of the plurality of segments of the TWA digital virtual gauge due to the heading of the mobile structure changing when the TWA is greater than or equal to 116.25° port to less than 68.75° port based on a current heading of mobile structure 101. In the depicted rendering, the controller 130 pans the displayed digital virtual segment so that a center of the digital virtual gauge is to the right of the user interface 120 and the range of displayed arc of the digital virtual gauge is displayed in the center of the user interface 120. Additionally, in the rendering, the controller arranges the other elements of the AWA, the AWD, and the TWD so that these elements are to the left of the user interface 120 to maintain the impression that the area of interest of digital virtual gauge is located in the center of the user interface 120.

Figure 3E:
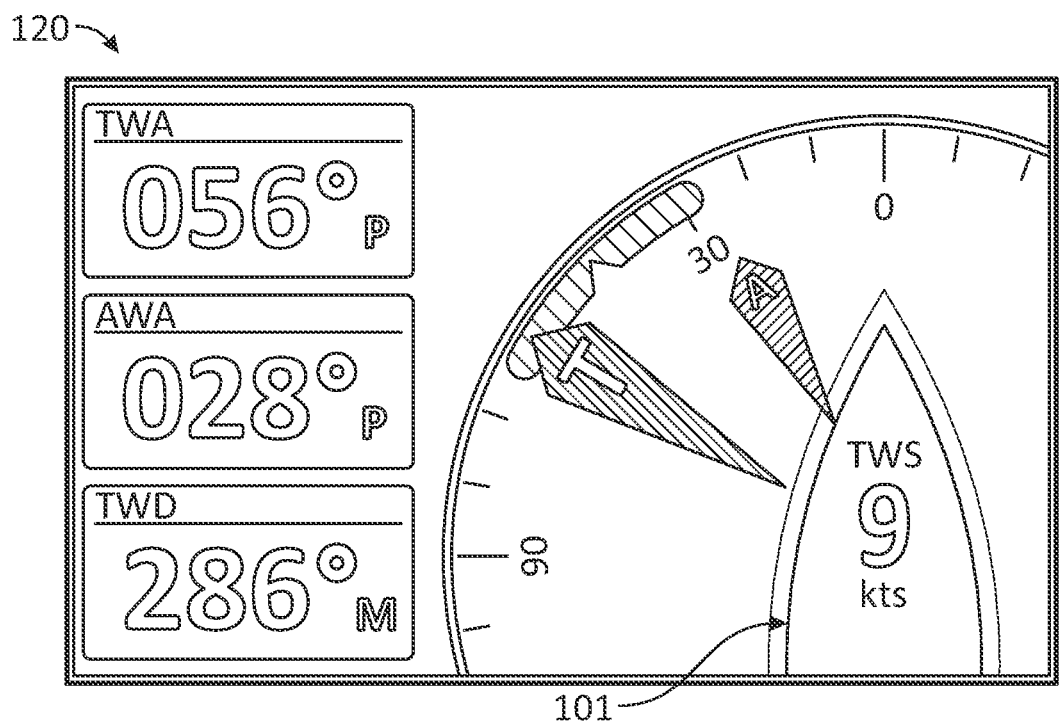

FIG. 3E illustrates the controller 130 rendering a fifth segment of the plurality of segments of the TWA digital virtual gauge due to the heading of the mobile structure changing when the TWA is greater than or equal to 68.75° port to less than 360°/0° based on a current heading of mobile structure 101. In the depicted rendering, the controller 130 pans the displayed digital virtual segment so that a center of the digital virtual gauge is to the bottom right of the user interface 120 and the range of displayed arc of the digital virtual gauge is displayed in the center of the user interface 120. Additionally, in the rendering, the controller arranges the other elements of the AWA, the AWD, and the TWD so that these elements are to the left of the user interface 120 to maintain the impression that the area of interest of digital virtual gauge is located in the center of the user interface 120.

Figure 4A:
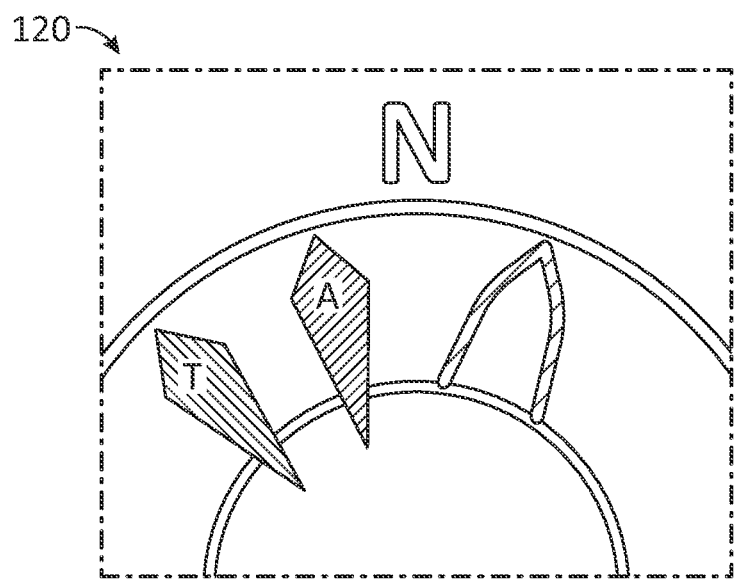
FIGS. 4A-4I illustrate the dynamic adjustment of a rendered compass digital virtual gauge to keep a relevant portion of the gauge within the confines of the user interface 120, thereby maximizing the relevant portion visible to the user of the mobile structure 101 in accordance with an embodiment of the disclosure.

FIGS. 4A-4I illustrate the dynamic adjustment of a rendered compass digital virtual gauge to keep a relevant portion of the gauge within the confines of the user interface 120, thereby maximizing the relevant portion visible to the user of the mobile structure in accordance with embodiments of the disclosure. FIG. 4A illustrates the controller 130 rendering a first segment of the plurality of segments of a compass digital virtual gauge, with North fixed upwards, when a current heading of a mobile structure is north-northeast (NNE). In the rendering in user interface 120, the true wind angle (TWA) is indicated by the "T" needle and the "A" needle indicates the Apparent Wind Angle (AWA). In the rendering, the controller 130 pans the displayed digital virtual segment so that a center of the digital virtual gauge is to the bottom center of the user interface 120 and the range of displayed arc of the digital virtual gauge is displayed in the center of the user interface 120.

Figure 4B:
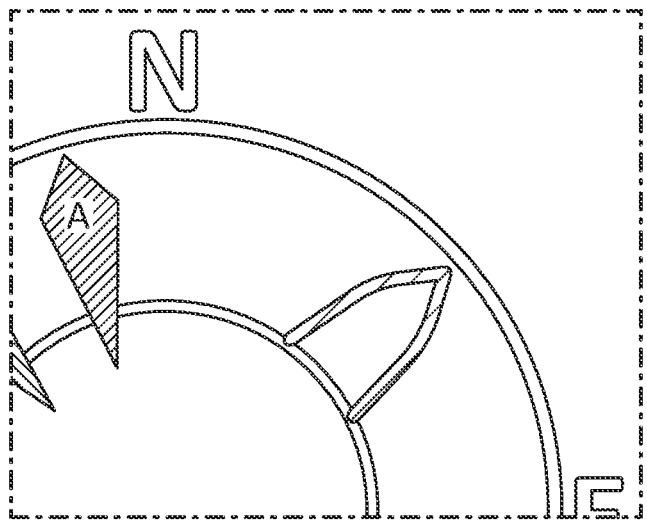

FIG. 4B illustrates the controller 130 rendering a second segment of the plurality of segments of the compass digital virtual gauge due to the heading of the mobile structure changing when a current heading of a mobile structure is east by northeast (NE). In the depicted rendering, the controller 130 pans the displayed digital virtual segment so that a center of the digital virtual gauge is to the bottom left of the user interface 120 and the range of displayed arc of the digital virtual gauge is displayed in the center of the user interface 120.

Figure 4C:
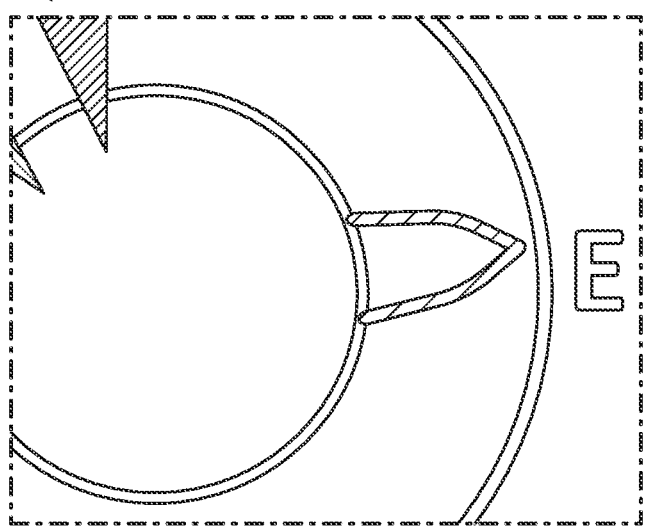

FIG. 4C illustrates the controller 130 rendering a third segment of the plurality of segments of the compass digital virtual gauge due to the heading of the mobile structure changing when a current heading of the mobile structure is east by north (EbN). In the depicted rendering, the controller 130 pans the displayed digital virtual segment so that a center of the digital virtual gauge is to the left of the user interface 120 and the range of displayed arc of the digital virtual gauge is displayed in the center of the user interface 120.

Figure 4D:
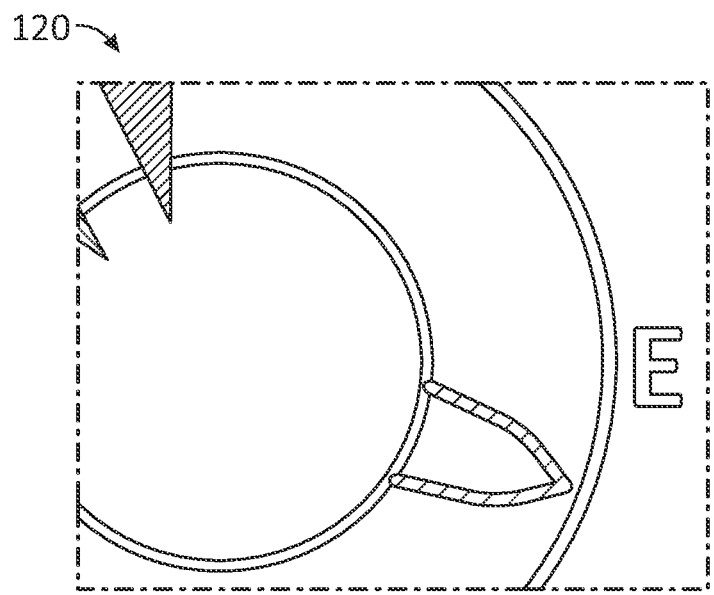

FIG. 4D illustrates the controller 130 rendering a fourth segment of the plurality of segments of the compass digital virtual gauge due to the heading of the mobile structure changing when a current heading of the mobile structure is east-southeast (ESE). In the depicted rendering, the controller 130 pans the displayed digital virtual segment so that a center of the digital virtual gauge is to the left of the user interface 120 and the range of displayed arc of the digital virtual gauge is displayed in the center of the user interface 120.

Figure 4E:
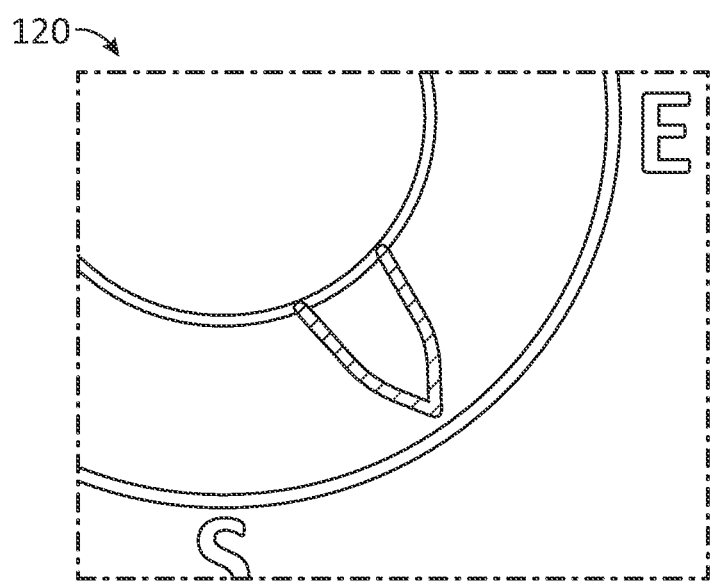

FIG. 4E illustrates the controller 130 rendering a fifth segment of the plurality of segments of the compass digital virtual gauge due to the heading of the mobile structure changing when a current heading of the mobile structure is southeast (SE). In the depicted rendering, the controller 130 pans the displayed digital virtual segment so that a center of the digital virtual gauge is to the top left of the user interface 120 and the range of displayed arc of the digital virtual gauge is displayed in the center of the user interface 120.

Figure 4F:
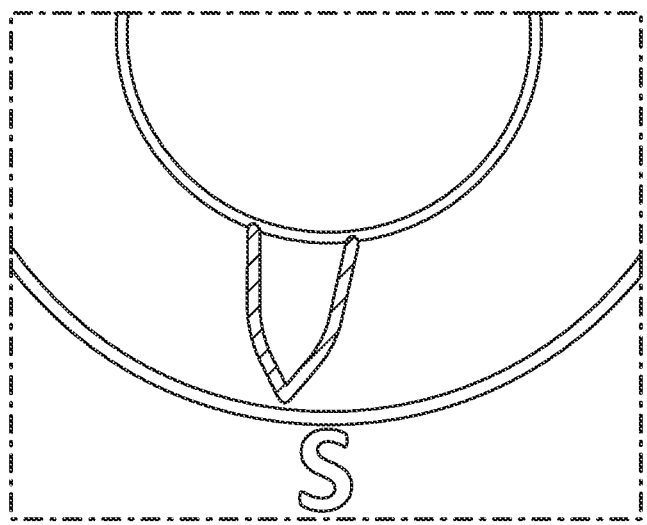

FIG. 4F illustrates the controller 130 rendering a sixth segment of the plurality of segments of the compass digital virtual gauge due to the heading of the mobile structure changing when a current heading of the mobile structure is south by west (SbW). In the depicted rendering, the controller 130 pans the displayed digital virtual segment so that a center of the digital virtual gauge is to the top center of the user interface 120 and the range of displayed arc of the digital virtual gauge is displayed in the center of the user interface 120.

Figure 4G:
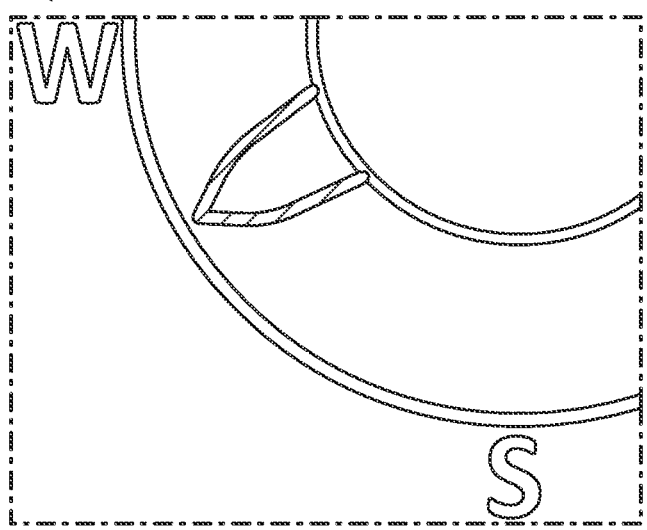

FIG. 4G illustrates the controller 130 rendering a seventh segment of the plurality of segments of the compass digital virtual gauge due to the heading of the mobile structure changing when a current heading of the mobile structure is southwest by west (SWbW). In the depicted rendering, the controller 130 pans the displayed digital virtual segment so that a center of the digital virtual gauge is to the top right of the user interface 120 and the range of displayed arc of the digital virtual gauge is displayed in the center of the user interface 120.

Figure 4H:
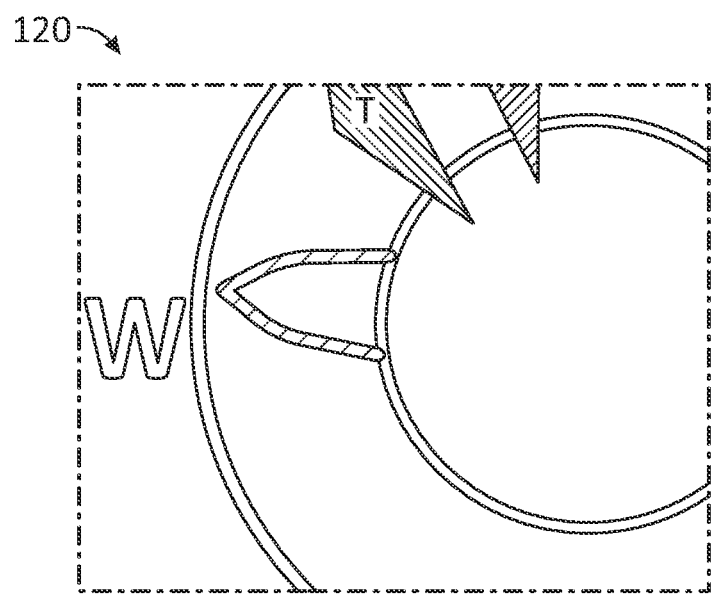

FIG. 4H illustrates the controller 130 rendering an eight segment of the plurality of segments of the compass digital virtual gauge due to the heading of the mobile structure changing when a current heading of the mobile structure is west by north (WbN). In the depicted rendering, the controller 130 pans the displayed digital virtual segment so that a center of the digital virtual gauge is to the right center of the user interface 120 and the range of displayed arc of the digital virtual gauge is displayed in the center of the user interface 120.

Figure 4I:
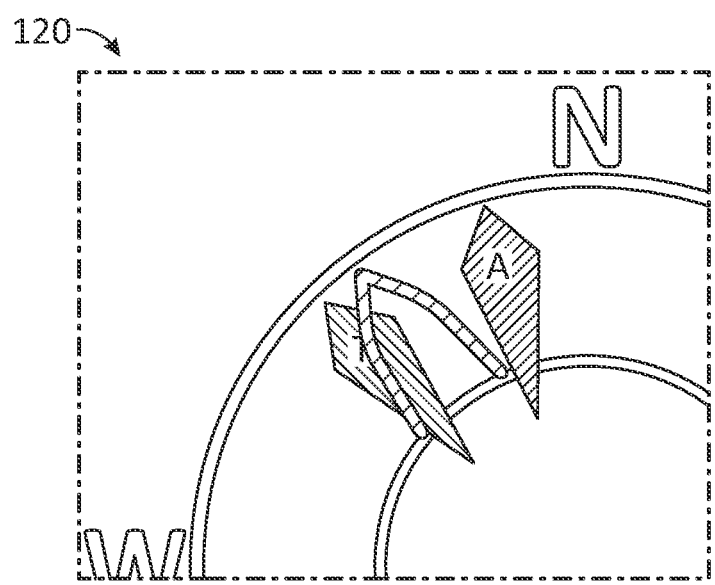

FIG. 4I illustrates the controller 130 rendering a ninth segment of the plurality of segments of the compass digital virtual gauge due to the heading of the mobile structure changing when a current heading of the mobile structure is northwest (NW). In the depicted rendering, the controller 130 pans the displayed digital virtual segment so that a center of the digital virtual gauge is to the bottom right of the user interface 120 and the range of displayed arc of the digital virtual gauge is displayed in the center of the user interface 120.

Thus, the illustrative embodiments provide a dynamically zoomed gauge system for enhanced accuracy that improves over traditional dial navigation system by providing a digital virtual gauge, which automatically zooms and/or pans to keep a most relevant portion of the gauge within the confines of the display, thereby maximizing visibility to the user of the mobile structure, by enlarging an area of interest most prevalent to the user.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   providing a virtual dial gauge comprising a plurality of segments, wherein each segment is associated with a corresponding range of values for a monitored condition based on information detected by one or more sensors of a mobile structure in response to environmental conditions associated with the mobile structure;
   receiving a first value within a first range of the range of values;
   rendering on a user display the first value with a first segment of the segments of the virtual dial gauge to include a center of the virtual dial gauge, wherein the first segment is associated with the first range and, while rendering the first segment, excluding from the user display at least a portion of a second segment of the segments of the virtual dial gauge associated with a second range of the range of values;
   receiving a second value associated with the second range;
   rendering on the user display the second value with the second segment of the virtual dial gauge to include the center of the virtual dial gauge, in response to the receiving of the second value, while excluding from the user display at least a portion of the first segment of the dial gauge;
   wherein the rendering of the second segment on the user display comprises panning from the first segment to the second segment while including the center of the virtual dial gauge within the rendering; and
   wherein the rendering of the first value, the panning, and the rendering of the second value operate together to maintain on the user display one of the first or second segments comprising a current value of the monitored condition and the center of the virtual dial gauge within the rendering.

2. The method of claim 1, wherein the panning comprises a continuous transition between the first segment and the second segment.

3. The method of claim 1, further comprising:
   determining that the second value satisfies a threshold condition, wherein the second segment is rendered in response to the satisfaction of the threshold condition.

4. The method of claim 1, wherein the virtual dial gauge is a digital representation of an analog instrument, and wherein the rendering of the first value, the panning, and the rendering of the second value operate to provide a close-up view of the current value, which is indicated by a direction needle.

5. The method of claim 1, wherein the values are a compass heading, wind speed, true wind angle (TWA), apparent wind angle (AWA), apparent wind direction (AWD), true wind direction (TWD), temperature, pressure, and/or speed, and wherein the virtual dial gauge is associated with a mobile structure, a watercraft, and/or a vehicle, and the method further comprising rendering an element associated with each of the values that is arranged aside the virtual dial gauge.

6. The method of claim 1, wherein the rendering on the user display of the first value is rendered such that an area of interest of the first segment is in a center of the user display, wherein the area of interest comprises an arc of the virtual dial gauge.

7. The method of claim 1, further comprising:
   prior to rendering on the user display the second value with the second segment while excluding from the user display the first segment, determining whether to render the second segment immediately or with a delay for a predetermined amount of time.

8. The method of claim 1, wherein the monitored condition is a first monitored condition, the method further comprising:
   receiving a third value associated with a second monitored condition and associated with the first range or the second range, the method further comprises rendering the third value with the first segment or the second segment.

9. The method of claim 1, further comprising:
   rearranging other elements associated with other monitored conditions rendered in the user display so as to maintain an impression that an area of interest of the first segment is located in the center of the user display.

10. The method of claim 1, wherein the virtual dial gauge is segmented based on user preferences or based on predefined settings.

11. A system comprising:
    a logic device configured to communicate with a user display and at least one operational state sensor, wherein the logic device is configured to:
    provide a virtual dial gauge comprising a plurality of segments, wherein each segment is associated with a corresponding range of values for a monitored condition based on information detected by the at least one operational state sensor of a mobile structure in response to environmental conditions associated with the mobile structure;
    receive a first value within a first range of the range of values;
    render on the user display the first value with a first segment of the segments of the virtual dial gauge to include a center of the virtual dial gauge, wherein the first segment is associated with the first range and, while rendering the first segment, excluding from the user display at least a portion of a second segment of the segments of the virtual dial gauge associated with a second range of the range of values;
    receive a second value associated with the second range;
    render on the user display the second value with the second segment of the virtual dial gauge to include the center of the virtual dial gauge, in response to the receiving of the second value, while excluding from the user display at least a portion of the first segment of the dial gauge;

wherein the rendering the second segment on the user display comprises panning from the first segment to the second segment; and wherein the rendering of the first value, the panning, and the rendering of the second value operate together to maintain on the user display one of the first or second segments comprising a current value of the monitored condition and the center of the virtual dial gauge with the rendering.

12. The system of claim 11, wherein the panning comprises a continuous transition between the first segment and the second segment.

13. The system of claim 11, wherein the logic device is further configured to:

determine that the second value satisfies a threshold condition, wherein the second segment is rendered in response to the satisfaction of the threshold condition.

14. The system of claim 11, wherein the virtual dial gauge is a digital representation of an analog instrument, and wherein the rendering of the first value, the panning, and the rendering of the second value operate to provide a close-up view of the current value, which is indicated by a direction needle.

15. The system of claim 11, wherein the values are a compass heading, wind speed, true wind angle (TWA), temperature, pressure, and/or speed, and wherein the virtual dial gauge is associated with a mobile structure, a watercraft, and/or a vehicle; and wherein the logic device is further configured to render an element associated with each of the values that is arranged aside the virtual dial gauge.

16. The system of claim 11, wherein the rendering on the user display of the first value is rendered such that an area of interest of the first segment is in a center of the user display, wherein the area of interest comprises an arc of the virtual dial gauge.

17. The system of claim 11, wherein the logic device is further configured to:

prior to rendering on the user display the second value with the second segment while excluding from the user display the first segment, determine whether to render the second segment immediately or with a delay for a predetermined amount of time.

18. The system of claim 11, wherein the monitored condition is a first monitored condition and wherein the logic device is further configured to:

receive a third value associated with a second monitored condition and associated with the first range or the second range, the method further comprises rendering the third value with the first segment or the second segment.

19. The system of claim 11, wherein the logic device is further configured to:

rearrange other elements associated with other monitored conditions rendered in the user display so as to maintain an impression that an area of interest of the first segment is located in the center of the user display.

20. The system of claim 11, wherein the virtual dial gauge is segmented based on user preferences or based on predefined settings.

* * * * *